Patented May 3, 1932

1,856,207

UNITED STATES PATENT OFFICE

HERMANN BRUNS, FRITZ BAUMANN, AND MAX KUGEL, OF LEVERKUSEN-ON-THE-RHINE, GERMANY, ASSIGNORS TO GENERAL ANILINE WORKS, INC., OF NEW YORK, N. Y., A CORPORATION OF DELAWARE

ANTHRIMIDO-CARBAZOLES

No Drawing. Application filed March 1, 1929, Serial No. 343,846, and in Germany March 3, 1928.

The present invention relates to the manufacture of 5-amino-4'-acidylamino-1.1'-anthrimido-carbazoles, and to the new products obtainable thereby, more particularly it relates to compounds of the general formula:

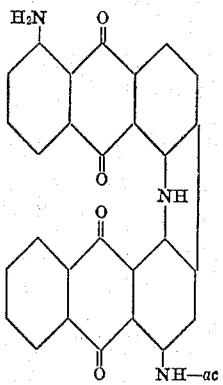

wherein $ac$ stands for an organic acidyl residue, such as an acetyl or benzoyl group, and wherein the anthraquinone nuclei may be substituted, for example, by halogen, the alkoxy- or hydroxy-group.

In accordance with the invention, it is possible to effect saponification of the carbazoles of the 5.4'-diacylamino-1.1'-anthrimides of the formula:

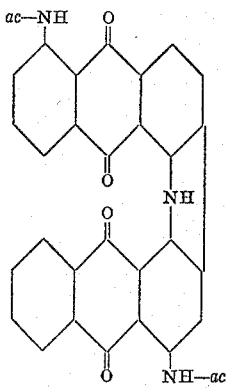

wherein the $ac$'s stand for organic acidyl residues with the result that the acidylamino group of the 5-position is saponified, without the second acylamino group being attacked. For this purpose the 5.4'-diacylamino-1.1'-anthrimido carbazoles are either treated with alcoholic caustic alkali or to obtain a better result heated in sulfuric acid to a temperature not exceeding 60% C. Temperatures between about 35–50° C. have been found the most advantageous.

The saponification is carried out in strong sulfuric acid, best in one of 96%. The time of the reaction differs according to the concentration of the sulfuric acid and the temperature used and varies between 1½ and 5 hours. The progress of the reaction can be followed by pouring a test portion into water. Any diamino compound formed can readily be detected by diazotization owing to the high solubility in water of the disazo compound.

When the reaction is complete, the temperature is allowed to cool to about 25° C., and the reaction mass is poured on to ice. The precipitate is filtered, washed until neutral and dried. The 5-amino-4'-acylamino-1.1'-anthrimide carbazoles, thus obtained, are dark brown powders in excellent yield and satisfactory purity. The substances are practically insoluble in toluene, chlorobenzene and many other organic solvents, partly soluble in hot naphthalene and nitrobenzene. They dissolve in concentrated sulfuric acid with a brown to reddish violet coloration. The products can be used as vat dyestuffs— (cotton is dyed red shades, fast to chlorine)— and as intermediate products for the manufacture of new dyestuffs.

The invention is illustrated by the following examples, without being limited thereto:

*Example 1.*—30 parts by weight of finely powdered 5.4'-dibenzoyldiamino-1.1'-anthrimido carbazole are introduced at ordinary temperature, while stirring, into 240 parts by weight of 96% sulfuric acid, and the reddish brown solution is heated to 50° C. The coloration of the sulfuric acid solution changes only slightly on heating; if however after 4 hours time a test portion of the melt is dropped into water, there is obtained no longer the brown flakes of the starting material, but a fiery, reddish brown, flocculent precipitate. When the paste is a pure reddish brown and no longer yellowish brown, the reaction is interrupted, and the melt is poured into about 6000 parts of ice water. The acid paste is then boiled, filtered while hot and washed until neutral. The substance, after drying at 100° C., is a dark brown powder, sparingly soluble in organic solvents, yielding in concentrated sulfuric acid a reddish brown solution and dissolves in 40% oleum with a blue coloration. With hydrosulfite-caustic soda solution, a yellowish brown vat is obtained, from which cotton is dyed reddish brown shades.

By diazotizing and boiling the diazo compounded in alcohol, the known 4-benzoylamino-1.1'-anthrimido carbazole is obtained, a proof that the benzoylamino group in the 5-position has been saponified.

*Example 2.*—10 parts by weight of 5.4'-dibenzoyldiamino-8-methoxy-1.1'-anthrimido carbazole (U. S. Patent No. 1,730,186) are introduced into 80 parts by volume of sulfuric acid of 66° Bé. and heated while stirring for 1½ hours to 35-40° C. The working up is effected as in Example 1 or by isolating the product in the form of its sulfate. In this manner, the 5-amino-4'-benzoylamino-8-methoxy-1.1'-anthrimido carbazole is obtained, after drying, as a dark violet powder.

The amino compound crystallizes from nitro-benzene, in which it dissolves with a dull violet coloration, in the form of greyish black, microscopic needles. The solution in 40% oleum is at first red, later greenish blue. The sulfuric acid solution is reddish violet and on the addition of formaldehyde turns to blue.

*Example 3.*—10 parts by weight of 5.4'-diacetyldiamino-1.1'-anthrimido-carbazole and 150 parts by weight of 10% alcoholic caustic potash are heated in a rotary autoclave for 6 hours at 110-115° C. A test portion, dissolved in sulfuric acid at the end of this time, must on pouring into water give a reddish brown precipitate, which should not redissolve on the addition of nitrite. When this condition has been reached, the contents of the autoclave are poured on to a filter and the filter-cake is washed several times with alcohol and finally with water. The brown powder obtained is the 5-amino-4'-acetylamino-1.1'-anthrimido-carbazole. The substance is sparingly soluble in organic solvents; sulfuric acid dissolves it with a brown coloration. The solution in 40% oleum is blue and the formaldehyde test olive green.

We claim:
1. The process which comprises heating a 5.4'-diacidyl-diamino-1.1'-anthrimido-carbazole of the general formula:

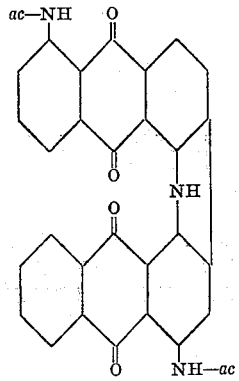

wherein the *ac*'s stand for organic acidyl residues and wherein the anthraquinone nuclei may be substituted, in strong sulfuric acid solution to a temperature not exceeding about 60° C. for some time.

2. The process which comprises heating a 5.4'-diacidyl-diamino-1.1'-anthrimido-carbazole of the general formula:

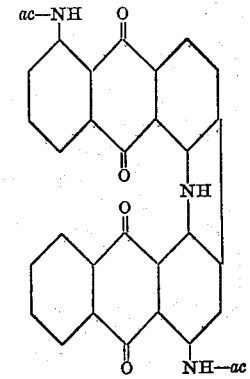

wherein the *ac*'s stand for organic acidyl residues, in a 96% sulfuric acid solution to a temperature between about 35-50° C. for several hours.

3. The process which comprises heating 5.4'-dibenzoyl-diamino-1.1'-anthrimido-carbazole in a 96% sulfuric acid to a temperature of about 50° C. for about 4 hours.

4. As new products 5-amino-4'-acidylamino-1.1'-anthrimido-carbazoles of the following general formula:

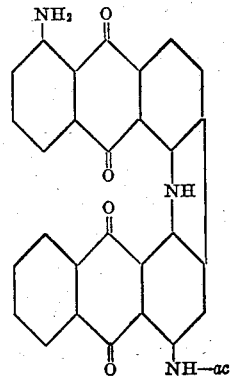

wherein *ac* stands for an organic acidyl group and wherein the anthraquinone nuclei may be substituted, being insoluble or sparingly soluble in organic solvents, dissolving in concentrated sulfuric acid with a brown to reddish violet coloration, and being valuable vat dyestuffs and intermediate products in the manufacture of dyestuffs.

5. As a new product 5-amino-4'-benzoylamino-1.1'-anthrimido-carbazole, being in the dry pulverized form a brown substance, sparingly soluble in organic solvents, dissolving in concentrated sulfuric acid with a reddish brown coloration, and forming with hydrosulfite-caustic solution a yellowish brown vat from which cotton is dyed reddish brown shades.

In testimony whereof we have hereunto set our hands.

HERMANN BRUNS. [L. S.]
FRITZ BAUMANN. [L. S.]
MAX KUGEL. [L. S.]